United States Patent Office 3,713,806
Patented Jan. 30, 1973

3,713,806
WEED KILLING COMPOSITIONS USING 2,4-BIS (ISOPROPYLAMINO) - 6 - METHOXY-TRIAZINE, 2,4-BIS(ISOPROPYLAMINO) - 6 - METHYLTHIO-s-TRIAZINE, PENTACHLOROPHENOL AND A 2,4-D COMPOUND
Michael Anthony Priola, Briarcliff Manor, N.Y., assignor to Ciba-Geigy Corporation
No Drawing. Continuation-in-part of application Ser. No. 692,693, Dec. 22, 1967, which is a continuation-in-part of application Ser. No. 492,931, Oct. 4, 1965. This application May 11, 1970, Ser. No. 36,384
The portion of the term of the patent subsequent to Jan. 12, 1988, has been disclaimed
Int. Cl. A01n 9/20
U.S. Cl. 71—93                                 5 Claims

ABSTRACT OF THE DISCLOSURE

Compositions containing 2,4-bis(isopropylamino)-6-methoxy-s-triazine, 2,4-bis(isopropylamino) - 6-methylthio-s-triazine, 2,4-D, pentachlorophenol and herbicidal oil are long-term weed killers. A single application of these compositions effectively controls weeds through an entire growing season.

CROSS-REFERENCE TO RELATED APPLICATIONS

This application is a continuation-in-part of my co-pending application Ser. No. 692,693, filed Dec. 22, 1967, now U.S. Pat. 3,554,732, which in turn is a continuation-in-part of my application Ser. No. 492,931, filed Oct. 4, 1965, now abandoned.

DETAILED DISCLOSURE

This invention is concerned with new compositions for killing weeds and with methods for their use. More particularly, it relates to synergistic herbicidal compositions containing herbicidal oil, pentachlorophenol, 2,4-diphenoxyacetic acid compounds and two diamino-s-triazines—namely, 2,4-bis(isopropylamino) - 6-methoxy-s-triazine and 2,4-bis(isopropylamino)-6-methylthio-s-triazine.

The term "weeds" as used herein includes the various broadleaf varieties of plants and also the grasses.

2,4-bis(isopropylamino)-6-methoxy-s-triazine and 2,4-bis(isopropylamino)-6-methylthio-s-triazine are among the diamino-s-triazines described in U.S. Pat. No. 2,909,-420 as having, even in low concentrations, an inhibitory effect on the growth of plants. 2,4-bis(isopropylamino)-6-methoxy-s-triazine, also known as "prometone," is sold under the trademarks Pramitol and Gesafram; for convenience sake, this compound will be referred to below as "prometone." 2,4-bis(isopropylamino)-6-methylthio-s-triazine, also known as "prometryne," is sold under the trademarks Caparol and Gesagard; it will be referred to below as "prometryne." Both of these compounds may be prepared by methods taught in U.S. Pat. No. 2,909,420.

In my application Ser. No. 692,693, there are disclosed compositions comprising herbicidal oil, pentachlorophenol, 2,4-diphenoxyacetic acid compounds, and one or more diamino-s-triazine compounds including specifically prometone and prometryne. These compositions, especially those in which the diamino-s-triazine compound is prometryne, were shown to provide surprisingly good long-term control of weeds.

It has now been found that the use of two specific diamino-s-triazines—namely, prometone and prometryne —in combination with herbicidal oil, pentachlorophenol, and 2,4-diphenoxyacetic acid compounds, provides exceptionally long-term control of weeds and is particularly beneficial for use along railway rights of way and in industrial sites.

The 2,4-dichlorophenoxyacetic acid compound used in the compositions of this invention may conveniently be in the form of an oil-soluble amine salt which dissolves in the herbicidal oil. One may also use an alkyl ester of the acid, particularly those in which the alkyl moiety has from 1 to 8 carbon atoms. Preferred esters include the methyl, ethyl, n-propyl, isopropyl, n-butyl, and iso-octyl esters of 2,4-dichlorophenoxyacetic acid. Likewise, the alkali metal salts (e.g., the sodium salt of 2,4-dichlorophenoxyacetic acid in aqueous suspension) or the acid itself in a suitable organic solvent, may be employed. All of these forms are included in the term "2,4-D" for present purposes.

The herbicidal oils used in the compositions of this invention are well-known in the art and are described in great detail with full specifications in "Herbicide Manual," Agriculture Handbook No. 269, by R. S. Dunham, published by Agriculture Research Service, U.S. Department of Agriculture, Washington, D.C., issued March 1965, pp. 12–13. Suitable herbicidal oils in the present compositions include aromatic oils such as solvent naphthas or petroleum naphthas, aliphatic oils such as mineral spirits, diesel oils, fuel oils, kerosene and the like. One may also use emulsifiable oils which contain a surfactant capable of causing emulsification of the oil when it is mixed with water. While these oils may have some initial weed-killing properties, their action, particularly on perennials, is usually temporary and even then, is ineffective on many of the common weeds. For this reason, these herbicidal oils will be treated here as solvents or carriers, although it is recognized that they have herbicidal effects on some weed species.

Many of the weed killers currently in use are merely what are commonly referred to as knockdown agents or "burners" which give an initial kill of the weeds but, after a short period of time, the weeds come back substantially as healthily and profusely as before. For many purposes, e.g., the control of weeds in railway roadbeds or in industrial sites, such temporary knockdown is obviously unsatisfactory. For these purposes it would be most desirable to have a herbicidal composition which could be applied once and would prevent the growth of weeds for the entire growing season. Such compositions have now been provided by this invention.

The various constituents of these new herbicidal compositions all have useful herbicidal properties, but by themselves they fail to provide the long-term control of weeds necessary for railway roadbeds and industrial sites. Likewise, combinations of weed killers, such as 2,4-D plus prometryne in herbicidal oil, are effective as knockdown agents but do not provide long-term control. On the other hand, compositions containing 2,4-D pentachlorophenol, and prometryne in herbicidal oil were found to give acceptable long-term control of weeds. In many instances, a single application of this composition provided good control of weeds for the entire growing season. In some instances, however, such as when the herbicidal compositions were applied early in the growing season or in areas of warm climate where the growing season is long, regrowth of weeds remained a problem. Where this regrowth was severe, it was often necessary to provide a second application of the herbicidal composition. The necessity of a second application in certain "problem" areas substantially increases the cost of long-term weed control. Thus, although acceptable long-term weed control could generally be obtained from this three-way combination, it would be considerably more advantageous to have a weed control composition which would provide long-term control even in areas where the growing season is long or when application of the composition is made in early spring. Accordingly, it is the object of this invention to provide a weed control composition for use along railway roadbeds or industrial sites, which composition would give season-long control of weeds with only a single application.

It has now been discovered that the incorporation of two diamino-s-triazines—namely, prometryne and prometone—into the aforementioned combination of pentachlorophenol and 2,4-D in herbicidal oil provides an exceptional degree of weed control. The initial effects of the composition containing herbicidal oil, pentachlorophenol, 2,4-D amine, prometryne and prometone are about the same as the analogous composition without prometone. As "knockdown agents," both the three-way and the four-way combinations have similar effect. The differences in the respective compositions become apparent when their long-term effects are compared. The four-way combination provides much better weed control when evaluations are made two months or longer after initial application. The single application early in the growing season is effective not only to kill weeds already growing at that time but also to prevent or substantially slow the growth of late-germinating weeds.

The amounts of the ingredients in these new compositions may be varied widely. Customarily, the amount of the individual components of the composition is stated on the basis of pounds or gallons used for the treatment of one acre. Prometryne and prometone are effective at a rate of as little as two pounds per acre each. This amount may be increased to as much as a total of 50 pounds per acre for both triazines, but it is generally not necessary to employ these compounds in such large amounts. It has been found that a total triazine concentration of about 4 to 12 pounds per acre, particularly 5 to 10 pounds per acre, provides exceptionally effective long-term control of weeds. Within the amount of total triazines used, the prometryne:prometone ratio should be (by weight) between about 4:1 and 1:4; conveniently, substantially equal amounts of prometryne and prometone may be used.

The herbicidal oil may be present in various amounts without materially affecting the results; however, between about 25 to about 50 gallons per acre is a convenient range. Likewise, the amounts of pentachlorophenol and 2,4-D are not critical, but it is preferable that each of these ingredients be used in amounts ranging from about 2 to about 12 pounds per acre. Generally, the pratcice is to use the minimum amounts of ingredients consistent with obtaining the desired results. It is especially convenient to use equal amounts by weight of 2,4-D and pentachlorophenol.

The compositions of this invention may also include any one or more of the additives commonly used in this field, such as the various wetting or dispersing agents, solvents, protective colloids, spreading agents, adhesives and the like, without adversely affecting the weed killing and long-term weed control activity of the compositions.

A series of comparative tests was carried out for the purpose of demonstrating the long-term herbicidal effectiveness of the compositions of this invention. These tests were conducted in an abandoned apple orchard near New Paltz, New York, in which were growing a wide variety of broadleaf and grassy weeds, including bluegrass, quackgrass, dandelion, goldenrod, and clover. The test areas were treated on May 20th, after emergence of the weeds. Herbicidal effectiveness was first rated on June 7th and again on August 8th. The ratings were made according to a 0 to 10 scale in which 0 indicates no control and 10 indicates complete kill.

The herbicidal compositions tested contained prometryne, prometone, the iso-octyl ester of 2,4-dichlorophenoxyacetic acid and pentachlorophenol, in various amounts in herbicidal oil. The compositions were applied at rates of 40 gallons per acre.

The following tables show the herbicidal effectiveness of the tested compositions. The data reported are, in each case, the average of three replications.

| No. | Composition-balance | | | | First rating | Second rating | |
| --- | --- | --- | --- | --- | --- | --- | --- |
| | Prometryne | Prometone | 2,4-D | Pentachlorophenol | | Broadleaf | Grasses |
| I | 5 | 3 | 4 | 4 | 9.3 | 9.3 | 4.9 |
| II | 8 | 0 | 4 | 4 | 9.3 | 5.9 | 2.1 |
| III | 8 | 0 | 2 | 2 | 9.3 | 6.5 | 3.1 |
| IV | 8 | 0 | 0 | 0 | 8.8 | 4.7 | 2.5 |
| V | 8 | 0 | 0 | 4 | 7.2 | 4.2 | 2.0 |
| VI | 0 | 0 | 4 | 4 | 6.5 | 4.0 | 1.6 |
| VII | 0 | 0 | 4 | 0 | 3.5 | 3.9 | 0.0 |

The first rating, which was made 18 days after treatment, indicates a high degree of weed kill for test No. I, which employed a composition according to this invention, and for tests Nos. II and III, which contained prometryne, 2,4-D, and pentachlorophenol. Slightly less effective but still satisfactory in terms of initial weed kill were compositions containing prometryne alone and prometryne plus pentachlorophenol in herbicidal oil.

The second rating, which was made more than two and one-half months after treatment, shows the superiority of compositions of this invention over the others tested. Although test Nos. II and III are markedly higher than the other tests, only test No. I shows an exceptionally high degree of long-term weed control.

I claim:

1. A method of killing weeds which comprises bringing into contact with at least a part of the weed, in an amount sufficient to kill the weed, a composition comprising (1) a herbicidal oil, (2) a derivative of 2,4-dichlorophenoxyacetic acid selected from the group consisting of 2,4-dichlorophenoxyacetic acid itself, an oil soluble amine salt of 2,4-dichlorophenoxyacetic acid, an alkyl ester of 2,4-dichlorophenoxyacetic acid in which the alkyl moiety has from 1 to 8 carbon atoms and an alkali metal salt of 2,4-dichlorophenoxyacetic acid, (3) pentachlorophenol, (4) 2,4 - bis(isopropylamino)-6-methoxy-s-triazine, and (5) 2,4 - bis(isopropylamino)-6-methylthio-s-triazine.

2. The method of claim 1 in which the composition is used in sufficient amount to impart at least two pounds each per acre of derivative of 2,4-dichlorophenoxyacetic acid, pentachlorophenol, 2,4-bis(isopropylamino)-6-methoxy-s-triazine and 2,4-bis(isopropylamino)-6-methylthio-s-triazine.

3. The method of claim 1 in which the 2,4-D is the iso-octyl ester of 2,4-dichlorophenoxyacetic acid.

4. A weed killer composition comprising herbicidally effective amounts of (1) a herbidical oil, (2) a derivative of 2,4-dichlorophenoxyacetic acid selected from the group consisting of 2,4-dichlorophenoxyacetic acid itself, an oil soluble amine salt of 2,4-dichlorophenoxyacetic acid, an alkyl ester of 2,4-dichlorophenoxyacetic acid in which the alkyl moiety has from 1 to 8 carbon atoms, and an alkali metal salt of 2,4-dichlorophenoxyacetic acid, (3) pentachlorophenol, (4) 2,4-bis(isopropylamino)-6-methoxy-s-triazine, and (5) 2,4-bis(isopropylamino)-6-methylthio-s-triazine.

5. The compositon of claim 4 in which the derivative of 2,4-dichlorophenoxyacetic acid is the iso-octyl ester of 2,4-dichlorophenoxyacetic acid.

References Cited

UNITED STATES PATENTS 3,554,732  1/1971  Priola _____ 71—122
2,909,420  10/1959  Gysin et al. _____ 71—93 X JAMES O. THOMAS, JR., Primary Examiner U.S. Cl. X.R.

71—120